Figure 1:
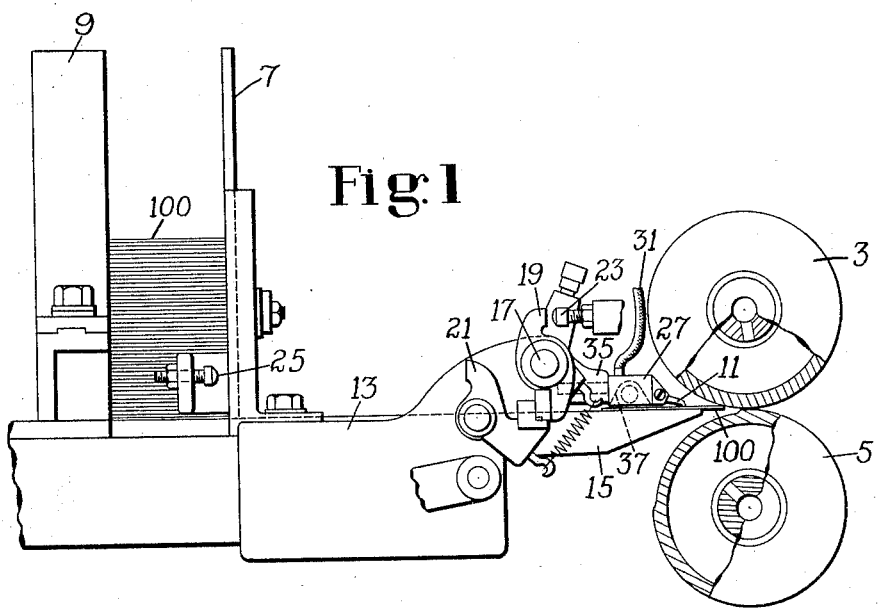

Oct. 25, 1932.  L. P. MELLERIO  1,884,800
MACHINE FOR TREATING SHOE STIFFENERS
Filed Jan. 29, 1931

INVENTOR-
Lucien P. Mellerio
By his Attorney,
Harlow M. Davis

Patented Oct. 25, 1932

1,884,800

UNITED STATES PATENT OFFICE

LUCIEN PAUL MELLERIO, OF LEICESTER, ENGLAND, ASSIGNOR TO UNITED SHOE MACHINERY CORPORATION, OF PATERSON, NEW JERSEY, A CORPORATION OF NEW JERSEY

MACHINES FOR TREATING SHOE STIFFENERS

Application filed January 29, 1931, Serial No. 512,081, and in Great Britain February 11, 1930.

The invention relates to the manufacture of stiffeners for parts of boots and shoes, and is herein illustrated as embodied in a machine for use in the manufacture of toe stiffeners containing a stiffening material which is softened before the stiffener is incorporated in the toe portion of the upper of a shoe preparatory to the pulling-over and lasting operations.

Toe stiffeners now in use in large quantities are commonly made of a porous base, such for example as felt, impregnated with a thermoplastic stiffening substance; and the rear margins of such stiffeners are commonly subjected to heat and pressure in such manner as to express more or less of the stiffening material so that said margin in the finished stiffener will have the desired flexibility. A machine for expressing thermoplastic stiffening material from the rear margin of stiffeners is disclosed in United States Letters Patent No. 1,704,818, granted March 12, 1929, upon an application filed in the names of William H. Bancroft, William J. Lund, and Maurice G. Hill on December 31, 1924. This machine comprises a die roll and a co-operating pressure roll to which thermoplastic toe stiffener blanks are fed one by one from a stack in a magazine. The rolls are heated by passing steam through them so that the stiffening material of the stiffener blanks is softened; and the die cavity in the die roller is of such shape that stiffening material is expressed from the rear margin of each blank.

In a machine of this general type in which the heated expressing members are depended upon to apply heat to the blank, it is obvious that there is a very definite limit to the output of the machine, since, with the expressing rolls as hot as it is practical to maintain them, it is not possible to rotate the rolls at more than a given speed. Otherwise the stiffening material of the blanks would not be softened sufficiently to be expressed.

In order, therefore, to increase the output of machines for expressing stiffening material from stiffener blanks, the present invention makes provision for softening the stiffening material of each blank before it reaches the expressing mechanism. In the illustrated machine, which is designed for use with thermoplastic stiffener blanks, the magazine for the stack of blanks is spaced somewhat from the expressing rolls, and there is carried by the feed member which feeds the blanks to the rolls a heat unit which heats each blank, or a selected locality thereof, before the blank reaches the expressing rolls. With this construction, in which the expressing members are not depended entirely upon to soften the stiffening material, it is obvious that the expressing rolls may be speeded up and that the output of machines of the old type may be greatly increased. Preferably the expressing rolls are heated as in the patented machine; and the heat imparted to the blanks as they are being fed to the rolls is merely sufficient to make good the shortage of heat which the blanks would otherwise experience had the patented machine merely been speeded up.

This and other features of the invention, including certain details of construction and combinations of parts will be described as embodied in an illustrated machine and pointed out in the appended claims.

Figure 2:
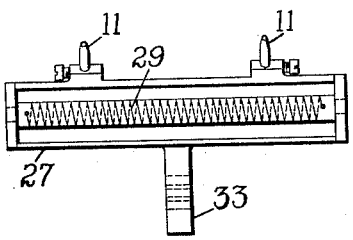

Referring now to the accompanying drawing,

Fig. 1 is an elevation of a portion of a machine in which the present invention is embodied; and Fig. 2 is a plan of the under side of the heat unit.

The mechanism for expressing stiffening material from the rear margins of the blanks may be the same as that disclosed in United States Patent No. 1,704,818 referred to above, and comprises a pressure roll 3 and a die roll 5, which may be heated by steam and driven in the proper directions as described in the patent. In the patented machine the magazine for the stack of blanks is located in proximity to the expressing rolls; and a reciprocating feed plate engages the lowermost blank of the stack and pushes it directly into position to be seized by the rolls. With such a construction it would be inconvenient to apply heat to a blank during its travel from the magazine to the expressing rolls.

Accordingly the magazine and the feed mechanism of the patented machine have been replaced by a magazine which is spaced a greater distance from the expressing rolls so as to provide a construction in which a considerable amount of heat may be applied to the blanks during their travel from the magazine to the expressing rolls. Any suitable magazine and feed mechanism may be employed, the one shown being disclosed and claimed in United States application Serial No. 402,266 filed October 24, 1929, in the names of Reginald B. Woodcock and Thomas A. Kestell. The magazine comprises a front plate 7 and adjustable side plates, one of which is shown at 9. The blanks 100 are taken one by one from the bottom of the stack by a horizontally reciprocating suction plate (not shown) and moved a short distance toward the expressing rolls. Each blank is taken from the suction plate, as the latter reaches its forward position, by a pair of feed fingers, 11, which are carried by a horizontally reciprocating slide 13, and slid over supporting bars, one of which is shown at 15, into a position to have its forward end seized by the expressing rolls, 3, 5. The feed fingers 11 are mounted upon a rock-shaft 17, the rocking movements of which are controlled by rocking levers 19, 21 and stops 23, 25 in such manner that the feed fingers 11 are swung down into engagement with a blank when the slide 13 approaches the extreme rear (left-hand) limit of its stroke, remain in that position while the blank is being fed, and are swung up when the slide 13 approaches the forward limit. No further description of this feed mechanism will be given since the details of its construction form no part of the present invention and any suitable feed mechanism may be employed.

In order to soften the stiffening material of each blank during the time that the blank is being fed toward the expressing rolls 3, 5, by the feed fingers 11, an electric heating device is provided. This device comprises a casing 27, which conveniently serves also as a mounting for the feed fingers 11, and a heating coil 29 in the casing connected with a flexible cable 31 whereby a current of electricity may be passed continuously through the coil. The casing is provided with a stem 33 which is clamped in a holder 35 attached to the rock-shaft 17. The recess in the casing 27, in which the heating coil is located, is open on its under side, and its surface is a portion of a parabolic cylinder as indicated by the dotted lines 37 in Fig. 2 so as to direct the heat rays from the coil downward upon the portion of the blank which is beneath the casing. This heating device may be of any size, shape or location desired. As illustrated, it is of a size, shape and location to heat the rear margin of the blank, that being in the present case the selected locality from which stiffening material is to be expressed.

Although the invention has been set forth as embodied in a particular machine for treating thermoplastic blanks, it should be understood that the invention is limited in the scope of its application neither to the particular type of blank nor to the particular machine which has been shown and described.

Having thus described my invention, what I claim as new and desire to secure by Letters Patent of the United States is:

1. A machine of the class described having, in combination, mechanism for expressing stiffening material from a selected locality in a stiffener blank, mechanism for feeding the blank to the expressing mechanism, and means independent of the expressing mechanism for softening the stiffening material of the blank to facilitate its expression before the blank reaches the expressing mechanism.

2. A machine of the class described having, in combination, mechanism for expressing stiffening material from a selected locality in a stiffener blank, mechanism for feeding the blank to the expressing mechanism, and means independent of the expressing mechanism for heating the blank to facilitate expression of stiffening material therefrom before the blank reaches the expressing mechanism.

3. A machine of the class described having, in combination, mechanism for expressing stiffening material from a selected locality in a stiffener blank, mechanism for feeding the blank to the expressing mechanism, and means independent of the expressing mechanism for softening the stiffening material during the travel of the blank toward the expressing mechanism.

4. A machine of the class described having, in combination, mechanism for expressing stiffening material from a selected locality in a stiffener blank, mechanism for feeding the blank to the expressing mechanism, and means independent of the expressing mechanism for heating the blank during the travel of the blank toward the expressing mechanism.

5. A machine of the class described having, in combination, mechanism for expressing stiffening material from a selected locality in a stiffener blank, a member adapted to engage the blank and feed it to said expressing mechanism, and means independent of the expressing mechanism moving with said feed member for softening the stiffening material.

6. A machine of the class described having, in combination, mechanism for expressing stiffening material from a selected locality in a stiffener blank, a member adapted to engage the blank and feed it to said expressing mechanism, and means independent of the expressing mechanism moving with said feed member for heating the blank.

7. A machine of the class described having, in combination, mechanism for expressing stiffening material from a selected locality in a stiffener blank, mechanism adapted to engage the blank and feed it to said expressing mechanism, and means for softening the stiffening material in the selected locality in the blank before the blank reaches the expressing mechanism, said means being restrained from engaging other localities.

8. A machine of the class described having, in combination, mechanism for expressing stiffening material from a selected locality in a stiffener blank, mechanism adapted to engage the blank and feed it to said expressing mechanism, and means moving with the blank-engaging member of the feed mechanism for softening the stiffening material in the selected locality in the blank before the blank reaches the expressing mechanism, said means being restrained from engaging other localities.

9. A machine of the class described having, in combination, a magazine for a stack of stiffener blanks, mechanism for expressing stiffening material from a selected locality in the blanks, means for feeding the blanks one by one to the expressing mechanism, and means independent of the expressing mechanism for subjecting the blanks to the action of a softening agent before they reach the expressing mechanism.

10. A machine of the class described having, in combination, a magazine for a stack of stiffener blanks, mechanism for expressing stiffening material from a selected locality in the blanks, means for feeding the blanks one by one to the expressing mechanism, and means independent of the expressing mechanism for heating the blanks before they reach the expressing mechanism.

11. A machine of the class described having, in combination, a magazine for a stack of stiffener blanks, mechanism for expressing stiffening material from a selected locality in the blanks, means for feeding the blanks to the expressing mechanism, and means for softening the stiffening material in the selected locality of each blank during the feeding movement and before the blank reaches the expressing mechanism.

12. A machine of the class described having, in combination, a magazine for a stack of stiffener blanks, mechanism for expressing stiffening material from a selected locality in the blanks, means for feeding the blanks to the expressing mechanism, and means for heating each blank in the selected locality during the feeding movement and before the blank reaches the expressing mechanism.

13. A machine of the class described having, in combination, a magazine for a stack of stiffener blanks, mechanism for expressing stiffening material from a selected locality in each blank, mechanism for transferring the blanks one by one from the magazine to the expressing mechanism, and a heat unit held in proximity to each blank during the transfer.

14. A machine of the class described having, in combination, a magazine for a stack of stiffener blanks, mechanism for expressing stiffening material from a selected locality in each blank, mechanism for transferring the blanks one by one from the magazine to the expressing mechanism, and a heat unit mounted on a movable member of the feed mechanism and held in proximity to each blank during its transfer.

15. A machine of the class described having, in combination, a magazine for a stack of stiffener blanks, a pair of rolls for expressing stiffening materials from a selected locality in each blank, mechanism including a reciprocating feed member for feeding the blanks to the expressing rolls, and a heat unit carried by the feed member for applying heat to each blank as it is fed.

16. A machine of the class described having, in combination, a magazine for a stack of stiffener blanks, mechanism for expressing stiffening material from a selected locality in each blank, mechanism for feeding the blanks one by one from the magazine to the expressing mechanism, and means located between the magazine and the expressing mechanism for softening stiffening material in the blank.

17. A machine of the class described having, in combination, a magazine for a stack of stiffener blanks, mechanism for expressing stiffening material from a selected locality in each blank, mechanism for feeding the blanks one by one from the magazine to the expressing mechanism, and means located between the magazine and the expressing mechanism for supplying heat to the blank in a selected locality.

18. A machine of the class described having, in combination, mechanism including a pair of suitably shaped rolls for expressing stiffening material from a selected locality in a blank and for moving the blank along during the expressing operation, mechanism for feeding a blank to the expressing mechanism, and means independent of the expressing mechanism for softening stiffening material of the blank to facilitate its expression before the blank reaches the expressing mechanism.

In testimony whereof I have signed my name to this specification.

LUCIEN PAUL MELLERIO.